United States Patent
Tamada

(10) Patent No.: US 9,500,250 B2
(45) Date of Patent: Nov. 22, 2016

(54) IMPACT ENERGY ABSORBER

(71) Applicant: Kyoraku Co., Ltd., Kyoto (JP)

(72) Inventor: Teruo Tamada, Yamato (JP)

(73) Assignee: KYORAKU CO., LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 14/410,362

(22) PCT Filed: Apr. 5, 2013

(86) PCT No.: PCT/JP2013/060527
§ 371 (c)(1),
(2) Date: Dec. 22, 2014

(87) PCT Pub. No.: WO2014/002566
PCT Pub. Date: Jan. 3, 2014

(65) Prior Publication Data
US 2015/0337917 A1    Nov. 26, 2015

(30) Foreign Application Priority Data

Jun. 26, 2012 (JP) .................................. 2012-143028

(51) Int. Cl.
*F16F 7/12* (2006.01)
*B60R 21/00* (2006.01)
*B60R 21/04* (2006.01)

(52) U.S. Cl.
CPC ............... *F16F 7/121* (2013.01); *B60R 21/04* (2013.01); *B60R 2021/0048* (2013.01); *B60R 2021/0442* (2013.01); *F16F 7/12* (2013.01)

(58) Field of Classification Search
CPC ........... F16F 7/121; F16F 7/12; B60R 21/04; B60R 2021/0048; B60R 2021/0442
USPC ........... 188/371, 377; 293/133, 121, 187.05; 280/777
See application file for complete search history.

(56) References Cited

U.S. PATENT DOCUMENTS 3,964,208 A * 6/1976 Renner .................. B60J 5/0412
296/146.2
6,036,227 A * 3/2000 Lin ...................... B60R 13/0225
188/377

(Continued)

FOREIGN PATENT DOCUMENTS

| EP | 2 119 935 | 11/2009 |
| JP | 2000-240707 | 9/2000 |
| JP | 2000240707 A * | 9/2000 |
| JP | 2004-306852 | 11/2004 |
| JP | 2004306852 A * | 11/2004 |
| JP | 2008/105517 | 9/2008 |

OTHER PUBLICATIONS

Machine Translation in English for JP 2000-240707A, Inventor: Hamano et al.; 3 pages; Retrieve Date: Dec. 14, 2015.*

(Continued)

*Primary Examiner* — Thomas J Williams
*Assistant Examiner* — Mariano Sy
(74) *Attorney, Agent, or Firm* — Troutman Sanders LLP

(57) ABSTRACT

An impact energy absorber with an excellent impact absorbing performance is obtained by varying rib thickness. The impact energy absorber made of resin and having a single-wall solid plate-like shape includes a planar portion and a projection body. The body includes a pair of side walls that rise from the planar portion and face each other, and a top wall joining the top portions of the walls. When Sa is the sectional area of the body, the area being obtained by cutting the body on the side wall at a vicinity to the top wall in a direction parallel to the top wall, and Sb is the sectional area of the body, the area being obtained by cutting the body on the side wall at a vicinity to the planar portion in a direction parallel to the top wall, $0.35 \leq Sb/Sa \leq 0.75$ is satisfied.

7 Claims, 13 Drawing Sheets

(56) References Cited

U.S. PATENT DOCUMENTS

| | | | | |
|---|---|---|---|---|
| 6,726,262 B2* | 4/2004 | Marijnissen | ............ | B60R 19/18 293/120 |
| 7,143,876 B2* | 12/2006 | Tamada | ................. | B60R 19/18 188/371 |
| 7,159,911 B2* | 1/2007 | Nguyen | ................. | B60R 19/18 293/102 |
| 7,249,662 B2* | 7/2007 | Itou | ........................... | F16F 7/12 188/371 |
| 7,513,344 B2* | 4/2009 | Toccalino | ................ | F16F 7/08 188/371 |
| 7,806,448 B2* | 10/2010 | Allen | ..................... | B60R 19/18 293/120 |
| 8,348,032 B2* | 1/2013 | Jacob | ........................ | B32B 3/02 188/268 |
| 8,443,950 B2 | 5/2013 | Tamada | | |
| 8,465,087 B2* | 6/2013 | Gerwolls | ................ | B60R 21/04 188/377 |
| 2004/0174025 A1* | 9/2004 | Converse | ................ | B60R 19/18 293/133 |
| 2010/0140032 A1 | 6/2010 | Tamada | | |
| 2012/0235443 A1* | 9/2012 | Tamada | ................. | B60J 5/0451 296/187.05 |

OTHER PUBLICATIONS

Machine Translation in English for JP 2004-306852A; Inventor Takeuchi; 4 pages; Retieve Date: Dec. 14, 2015.*

International Search Report dated Jul. 9, 2013, which issued during prosecution of International Application No. PCT/JP2013/060527, which corresponds to the present application.

* cited by examiner

IMPACT ENERGY ABSORBER

CROSS REFERENCE TO RELATED APPLICATIONS

This application is a U.S. National Phase Application under 35 U.S.C. §371 of International Patent Application PCT/JP2013/060527 filed Apr. 5, 2013, which claims priority to Japanese Patent Application 2012-143028 filed Jun. 26, 2012. The International Application was published on Jan. 3, 2014, as International Publication No. WO 2014/002566 under PCT Article 21(2). The entire contents of these applications are hereby incorporated by reference.

TECHNICAL FIELD

The present invention relates to an impact energy absorber, and more specifically to an impact energy absorber with a simple structure and the excellent energy absorbing characteristic.

BACKGROUND ART

An impact energy absorber absorbs the impact energy generated from an external impact load caused by the collision of a vehicle. Therefore, conventionally, the impact energy absorber has been used to protect a passenger inside the vehicle. The impact energy absorber is set, for example, inside a door panel or a ceiling panel.

The impact energy absorbers having been conventionally employed as the structure that receives the impact load are roughly classified into a lattice shaped rib type, a truncated cone shaped rib type, and a long-groove rib type.

Patent Literature 1 discloses the long-groove rib type. This type includes a first wall disposed on a side which receives the impact, and a second wall separated from and opposed to the first wall across a hollow portion. Each of the first wall and the second wall has a long-groove shaped recess. Thus, the above type includes a plurality of impact absorbing ribs each having: a deep-groove portion having a welding surface formed therein by joining the front end surfaces of the recesses to each other; and, a shallow-groove portion having the front end surfaces of the recesses, the surfaces being separated from and opposed to each other. The long groove is formed by sucking one surface of each of two molten thermoplastic resin sheets toward the corresponding mold or by pressing the other surface thereof toward the mold. Next, the split mold blocks are clamped to weld the end surfaces of the long grooves together and form the hollow portion through the formation of an annular parting line.

Then, it has been known that the so-called double-wall impact energy absorber disclosed in Patent Literature 1 can absorb the highest impact energy by making the thicknesses of the ribs and of the grooves more even.

It has generally been known that the energy that absorbs impact is calculated by the product of the load and the area defined by a load-compressive strain curve and an axis representing compressive strain. The area defined by the load-compressive strain curve and the axis representing compressive strain is desired to be maximized. Therefore, in a region where the compressive strain is approximately 20 to 70% as indicated by a dotted line in FIG. 18, the waveform representing the substantially constant load close to the upper-limit value (hereinafter this waveform is also referred to as "rectangular waveform") is ideal. Note that the upper-limit value is properly determined depending on the portion to which the impact absorber is attached and on the purpose of attaching the impact absorber.

It has been known that the impact energy absorber, disclosed in the above-mentioned Patent Literature 1, having the double wall molded to form a hollow by the blow molding can absorb the highest impact energy by making the thicknesses of the ribs and of the grooves more even. This has achieved a load-compressive strain curve extremely close to the ideal rectangular waveform that can be achieved only by the ideal impact energy absorber.

CITATION LIST

Patent Literature

Patent Literature 1: WO2008/105517

SUMMARY OF INVENTION

Problems to be Solved by the Invention

In the technical field of the impact energy absorbers, such absorbers are not necessarily limited to the double-wall impact energy absorber as long as the ideal rectangular waveform can be realized. Even the single-wall impact energy absorbers obtained by the blow molding or vacuum molding have been tested and studied, through improving the thicknesses of the ribs and grooves, in order to obtain the impact energy absorber exhibiting the ideal rectangular waveform.

Attempts have been made for the molding that enables the ribs and grooves of the conventional single-wall impact energy absorber to have the substantially homogeneous thickness in a manner similar to the double-wall impact energy absorber. For achieving the ideal rectangular waveform, however, the further improvement of the impact absorbing performance has been required.

The present invention has been made in view of the above. An object of the present invention is to provide an impact energy absorber with an improved impact absorbing performance by changing the thickness of the rib.

Solutions to the Problems

To solve the above problem, an impact energy absorber according to claim 1 is made of resin and having a single-wall solid plate-like shape. The impact energy absorber including: a planar portion; and a projection body, wherein: the projection body includes a pair of side walls that rise from the planar portion and face each other, and a top wall joining top portions of the pair of side walls; the pair of side walls is formed so that the thickness of the walls shown in a section increases continuously from the planar portion toward the top wall; and $0.35 \leq Sb/Sa \leq 0.75$ is satisfied, wherein: Sa is a sectional area of the projection body, the area being obtained when the body is cut on the side walls at a vicinity to the top wall in a direction parallel to the top wall; and Sb is a sectional area of the projection body, the area being obtained when the body is cut on the side walls at a vicinity to the planar portion in a direction parallel to the top wall.

In addition, an impact energy absorber according to claim 2 is the impact energy absorber according to claim 1, wherein the projection body is configured to form a groove-like recess with a predetermined length in the planar portion.

Furthermore, an impact energy absorber according to claim 3 is the impact energy absorber according to claim 1 or 2, wherein a thickness variation ratio of the side wall is 40% or more.

Note that the top wall vicinity of the side wall refers to an end on the top wall side of a portion of the side wall linearly (in a planar shape) extending from a planar portion side to the top wall side. When the portion where the side wall joins the top wall is curved, the top wall vicinity corresponds to the boundary between the curved portion and the linear portion. Similarly, the planar portion vicinity of the side wall refers to an end on the planar portion side of a portion of the side wall linearly (in a planar shape) extending from the top wall side to the planar portion side. When the portion where the side wall joins the planar portion is curved, the planar portion vicinity corresponds to the boundary between the curved portion and the linear portion.

Effects of the Invention

According to the present invention, the impact energy absorber that can achieve a load-compressive strain curve extremely close to the ideal rectangular waveform that can be obtained by the ideal impact energy absorber can be obtained.

DESCRIPTION OF EMBODIMENTS

Figure 1:
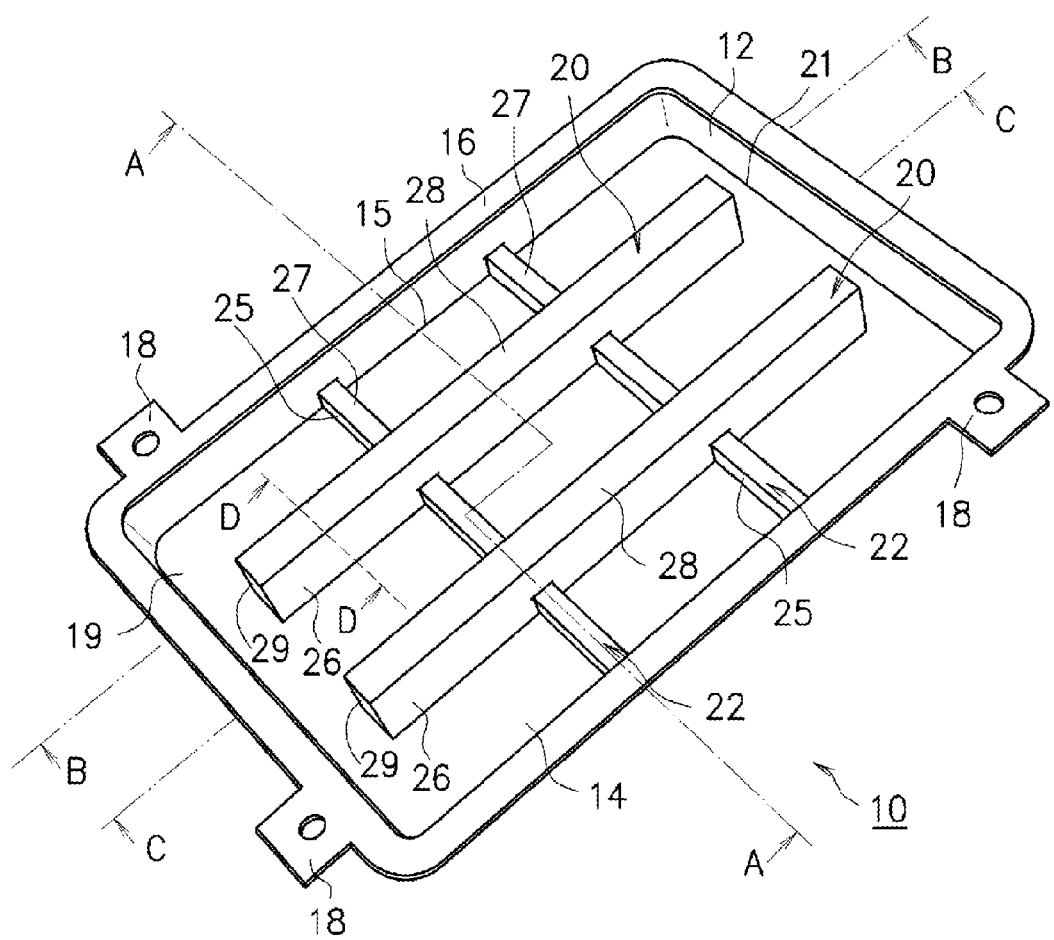
FIG. 1 is a perspective diagram of an impact energy absorber according to an embodiment of the present invention.
Figure 2:
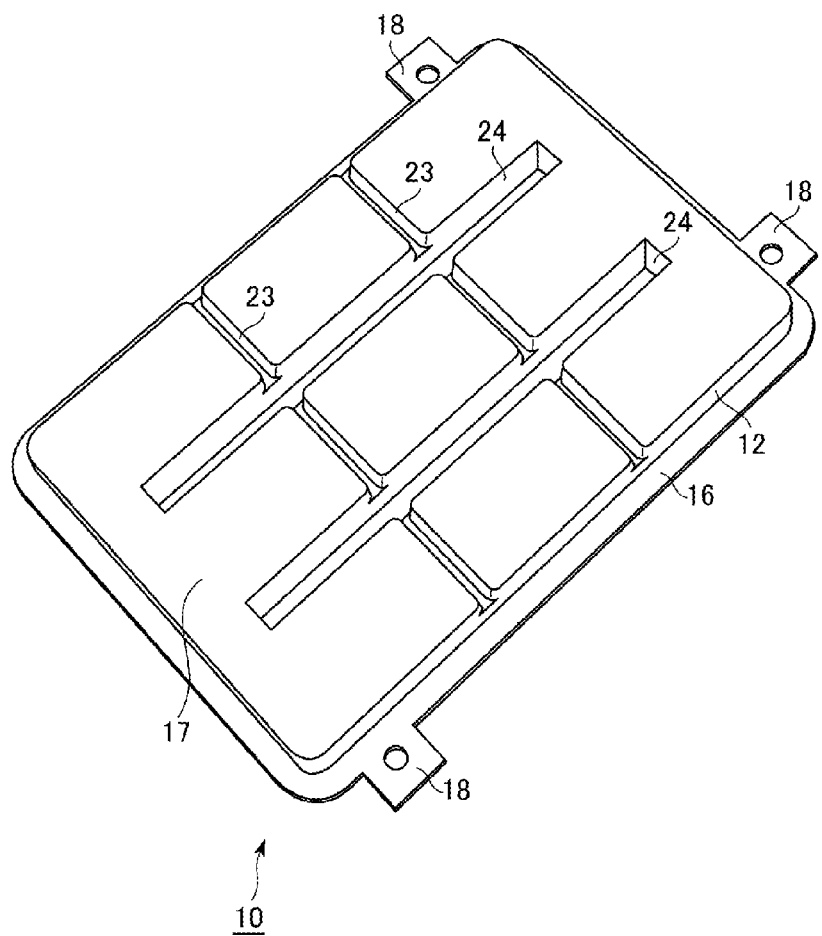
FIG. 2 is a perspective diagram of the impact energy absorber according to the embodiment of the present invention, which is viewed from a direction opposite to that of FIG. 1.
Figure 3:
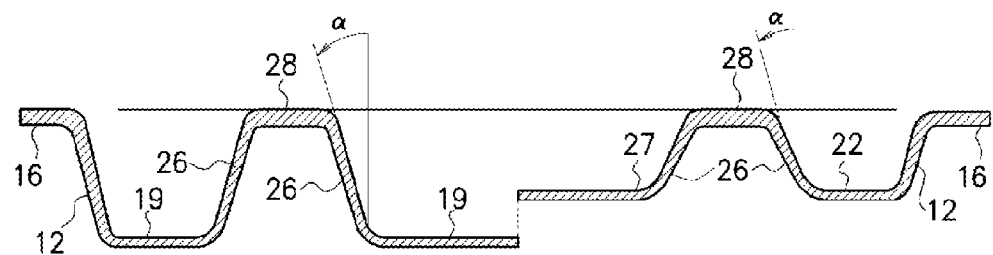
FIG. 3 is a sectional diagram taken along a line A-A of FIG. 1.

An embodiment of the present invention is described next in detail with reference to the drawings. In each drawing, the same portions or the corresponding portions are denoted by the same reference symbol. The overlapping description is simplified or omitted as appropriate. The dimension ratio of the drawing is not limited to the illustrated ratio. An impact energy absorber according to an embodiment of the present invention is described in detail with reference to FIGS. 1 to 3. FIG. 1 is a perspective diagram of the impact energy absorber according to the embodiment of the present invention. FIG. 2 is a perspective diagram of the impact energy absorber according to the embodiment of the present invention, which is viewed from a direction opposite to that of FIG. 1. FIG. 3 is a sectional diagram taken along a line A-A of FIG. 1.

As illustrated in FIGS. 1 and 2, an impact energy absorber 10 has a single-wall structure made of resin with a rectangular thin plate shape. The impact energy absorber 10 is monolithically formed by a molding method as described below. The impact energy absorber 10 includes a peripheral wall 12, and a rectangular planar portion 14 on the inside surrounded by the peripheral wall 12. The height of the peripheral wall 12 and the size of the rectangular planar portion 14 may be determined depending on where in the vehicle the impact energy absorber 10 is to be installed or how large the impact load is expected to be. The outer periphery of the peripheral wall 12 is provided with an extension flange 16 so as to extend outward from the rectangular planar portion 14. The extension flange 16 is provided with a fixture portion 18. Through the fixture portion 18, the impact energy absorber 10 can be attached to the vehicle.

The impact energy absorber 10 is made of a thermoplastic resin. The thermoplastic resin is, for example, an olefin-based resin such as polyethylene or polypropylene, an amorphous resin, or the like. More specifically, the resin is polyolefin (such as polypropylene and high-density polyethylene), which is a homopolymer or a copolymer of olefins such as ethylene, propylene, butene, isoprene pentene, and methyl pentene.

As illustrated in FIG. 1, two first projection bodies 20 and two second projection bodies 22 are provided within the rectangular planar portion 14. Each of the first projection bodies 20 extends almost entirely along, and in parallel to one opposite side 15 of the rectangular planar portion 14 at predetermined intervals. FIG. 1 illustrates the two first projection bodies 20 and the two second projection bodies 22; however, needless to say, the number of first projection bodies 20 and second projection bodies 22 can be set freely in accordance with the size of the rectangular planar portion 14.

As illustrated in FIGS. 2 and 3, each of the first projection bodies 20 is configured to form a long deep groove 24 from one plate surface 17 toward the other plate surface 19 on the rectangular planar portion 14 side. The first projection body 20 includes a pair of opposite side walls of long-side direction rising slope walls 26 and short-side direction rising slope walls 29, and a top wall 28 that joins the top portions of the long-side direction rising slope walls 26 and the short-side direction rising slope walls 29.

Figure 4:
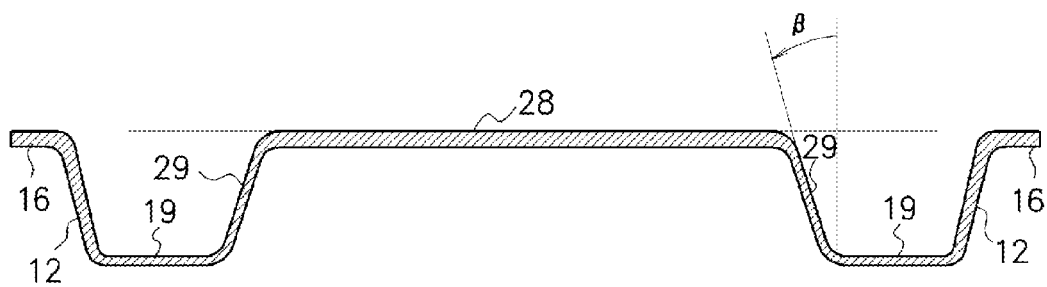
FIG. 4 is a sectional diagram taken along a line B-B of FIG. 1.
Figure 5:
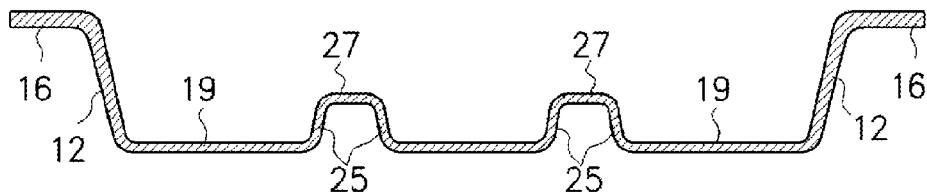
FIG. 5 is a sectional diagram taken along a line C-C of FIG. 1.

Next, detailed description is made of the first projection body 20 and the second projection body 22 with reference to FIGS. 4 and 5. FIG. 4 is a sectional diagram taken along a line B-B of FIG. 1, and FIG. 5 is a sectional diagram taken along a line C-C of FIG. 1.

As illustrated in FIG. 3, the pair of long-side direction rising slope walls 26 that face each other is inclined at a predetermined inclination angle $\alpha$ so that the walls 26 approach each other toward the top wall 28 from the other plate surface 19. The section of each of the first projection bodies 20, which is orthogonal to the long-side direction, has a trapezoidal outer shape. As illustrated in FIG. 4, the pair of short-side direction rising slope walls 29 that face each other is inclined at a predetermined inclination angle $\beta$ so that the walls 29 approach each other toward the top wall 28 from the other plate surface 19. The section of each of the first projection bodies 20 is orthogonal to the short-side direction and has a trapezoidal outer shape. The top wall 28 has a rectangular shape.

The thickness of the first projection body 20 may be determined so that the desired energy absorbing characteristic can be obtained and the weight can be reduced. The thickness variation ratio of the long-side direction rising slope wall 26 (side wall) out of the trapezoid as the outer shape of the section of the first projection body 20 that is orthogonal to the long-side direction thereof and the trapezoid as the outer shape of the section of the first projection body 20 that is orthogonal to the short-side direction thereof (hereinafter these are collectively referred to as "trapezoidal rib") is preferably 40% or more. This is one of the vital points of the present invention. Detailed description thereto is therefore made below.

The average thickness of the entire impact energy absorber 10 including the trapezoidal rib is preferably 1.8 mm or less. It is preferable that a thin portion with a thickness of a least 0.8 mm or less exists. Moreover, even the thinnest portion desirably has a thickness of 0.15 mm or more.

The predetermined inclination angles $\alpha$ and $\beta$ are preferably 2° to 15° from the viewpoint of: setting the thickness variation ratio of the trapezoidal rib to 40% or more; preventing the collapse of the long-side direction rising slope wall 26 as the side wall in the case where the impact load is applied oblique to the other plate surface 19; and preventing the collapse (reaching the bottom) of the top wall 28 toward the other plate surface 19 in the case where the impact load is applied in a direction orthogonal to the other plate surface 19 (frontward). More preferably, the predetermined inclination angle $\alpha$ is 3 to 7° and the predetermined inclination angle $\beta$ is 6 to 10°.

It is effective that the predetermined inclination angles $\alpha$ and $\beta$ are smaller than 2° in order to prevent the top wall 28 from reaching the bottom. However, the collapse of the long-side direction rising slope wall 26 as the side wall is caused. On the contrary, an angle of more than 15° is effective to prevent the collapse of the long-side direction rising slope wall 26 as the side wall. However, this causes the top wall 28 to reach the bottom. Moreover, it is preferable that the predetermined inclination angles $\alpha$ and $\beta$ can be changed in the range of 2° to 15°. Note that the predetermined inclination angles $\alpha$ and $\beta$ can be adjusted by allowing the inclination angle of the protrusion (recess) of a mold to be described below, i.e., the tapered angle of the mold (extracting angle) to be changed.

Each of the second projection bodies 22 extends, in a manner similar to the first projection bodies 20, almost entirely along, and in parallel to the other opposite side 21 at predetermined intervals while crossing each of the first projection bodies 20 as illustrated in FIG. 1. More specifically, each of the second projection bodies 22 joins the peripheral wall 12 and the rising slope wall 26 of the first projection body 20 closest to the peripheral wall 12.

Each of the second projection bodies 22 is configured to form, in a manner similar to the first projection bodies 20, a long shallow groove 23 from one plate surface 17 toward the other plate surface 19 on the rectangular planar portion 14 side, as illustrated in FIG. 2. The second projection body 22 includes, as illustrated in FIG. 5, a pair of opposite rising slope walls 25 and a top wall 27 joining the top portions the rising slope walls 25. The pair of opposite rising slope walls 25 is inclined at such a predetermined inclination angle that the walls approach each other from the other plate surface 19 toward the top wall 27. The shape of the section of the projection body 22, which is orthogonal to the extending direction of the second projection body 22, is trapezoidal. In addition, the top wall 27 is rectangular.

The upper surface level of the top wall 27 is lower than the upper surface of the extension flange 16. The upper surface level of the top wall 27 is connected at a root portion of the first projection body 20. Thus, particularly when the impact load is applied oblique to the rectangular planar portion 14, the collapse of the long-side direction rising slope wall 26 as the side wall of the first projection body 20 is suppressed. This secures the enough margin of the deformation of the long-side direction rising slope wall 26 as the side wall.

Figure 6:
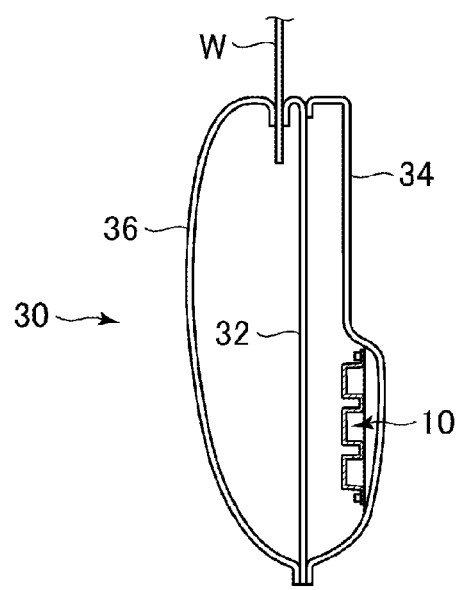
FIG. 6 is a schematic diagram illustrating a state in which the impact energy absorber according to the embodiment of the present invention is provided inside the door panel of a vehicle.

FIG. 6 is a schematic diagram illustrating the state in which the impact energy absorber according to the embodiment of the present invention is attached inside the door panel of the vehicle. As illustrated in FIG. 6, the impact energy absorber 10 is attached to a door panel 30. More specifically, the impact energy absorber 10 is fixed to a door trim 34 with a clip in a hollow portion between an inner panel 32 and the door trim 34 through the fixture portion 18 (FIG. 1) of the extension flange 16. This causes, upon the side impact of the vehicle, the shoulder or waist part of the passenger to collide with the other plate surface 19 side through the door trim 34. On this occasion, the impact energy absorber 10 is crushed, thereby reducing the stress applied on the passenger.

Figure 7:
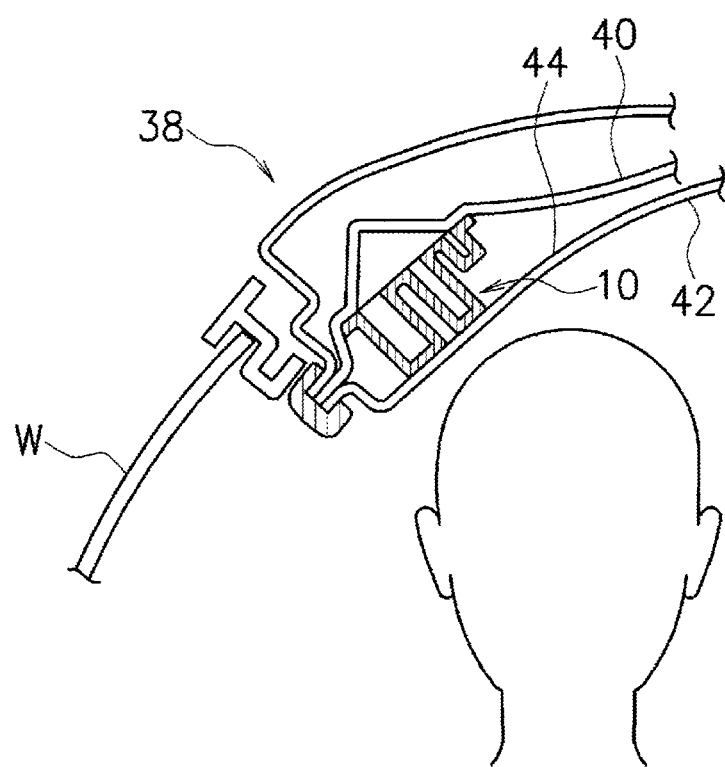
FIG. 7 is a schematic diagram illustrating a state in which the impact energy absorber according to the embodiment of the present invention is provided inside the ceiling panel of a vehicle.

FIG. 7 is a schematic diagram illustrating the state in which the impact energy absorber according to the embodiment of the present invention is attached to the inside of a ceiling panel of the vehicle. As illustrated in FIG. 7, the impact energy absorber 10 is attached to a ceiling panel 38. The impact energy absorber 10 is fixed to an inner surface 44 of a roof trim 42 in a hollow portion between an inner panel 40 and the roof trim 42 by applying a hot-melt adhesive to the upper surface of the top wall 28. In the occurrence of the side impact of the vehicle, thus, the head part of the passenger collides with the one plate surface 17 side through the roof trim 42, thereby protecting the head part.

Figure 8:
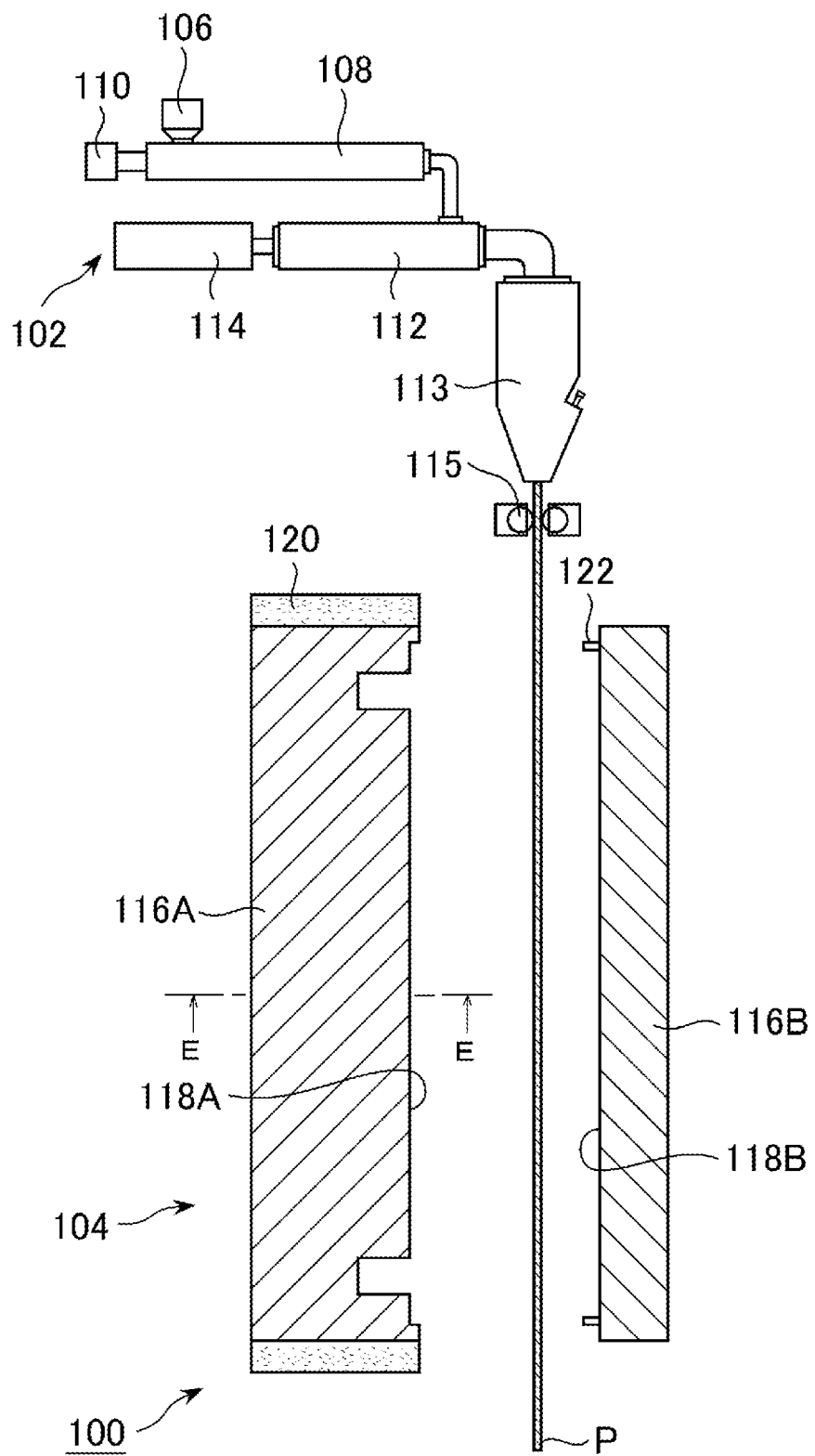
FIG. 8 is a schematic diagram illustrating a state in which split mold blocks are opened in the molding step of molding the impact energy absorber according to the embodiment of the present invention.
Figure 9:
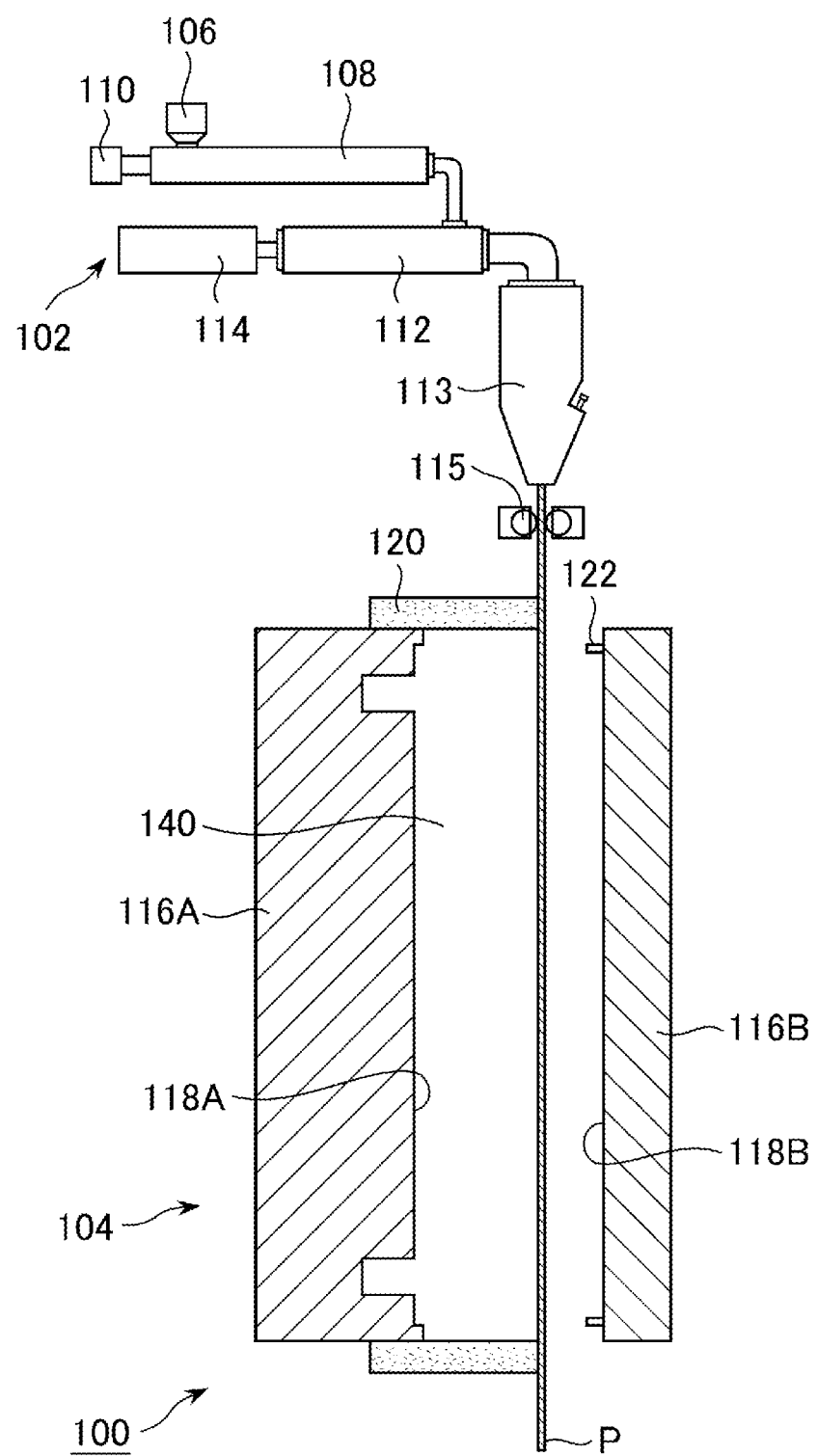
FIG. 9 is a schematic diagram illustrating a state in which a sealed space is formed between the cavity and the thermoplastic resin sheet in the molding step of molding the impact energy absorber according to the embodiment of the present invention.
Figure 10:
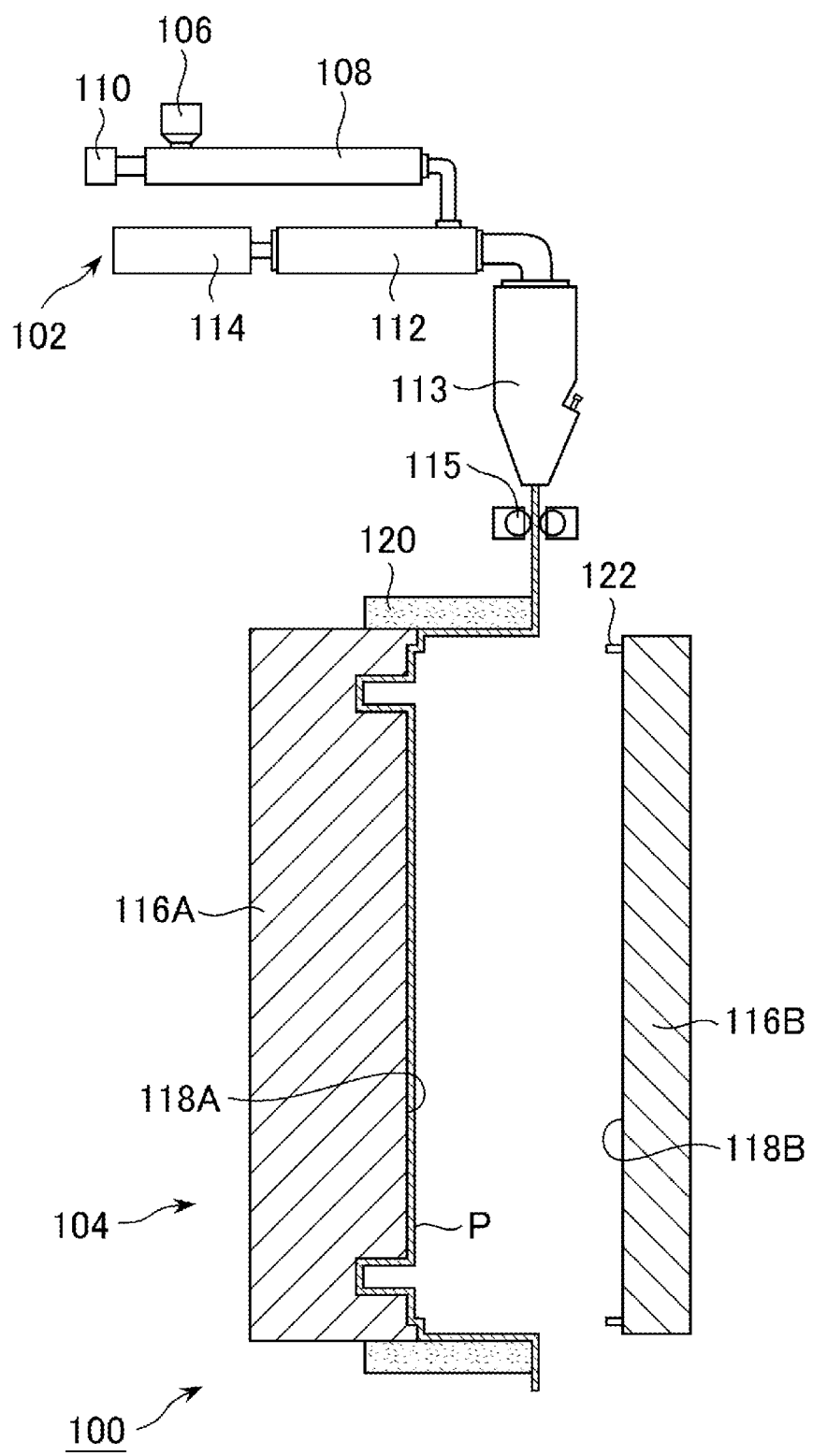
FIG. 10 is a schematic diagram illustrating a state in which the thermoplastic resin sheet is shaped by pressure reduction in the molding step of molding the impact energy absorber according to the embodiment of the present invention.
Figure 11:
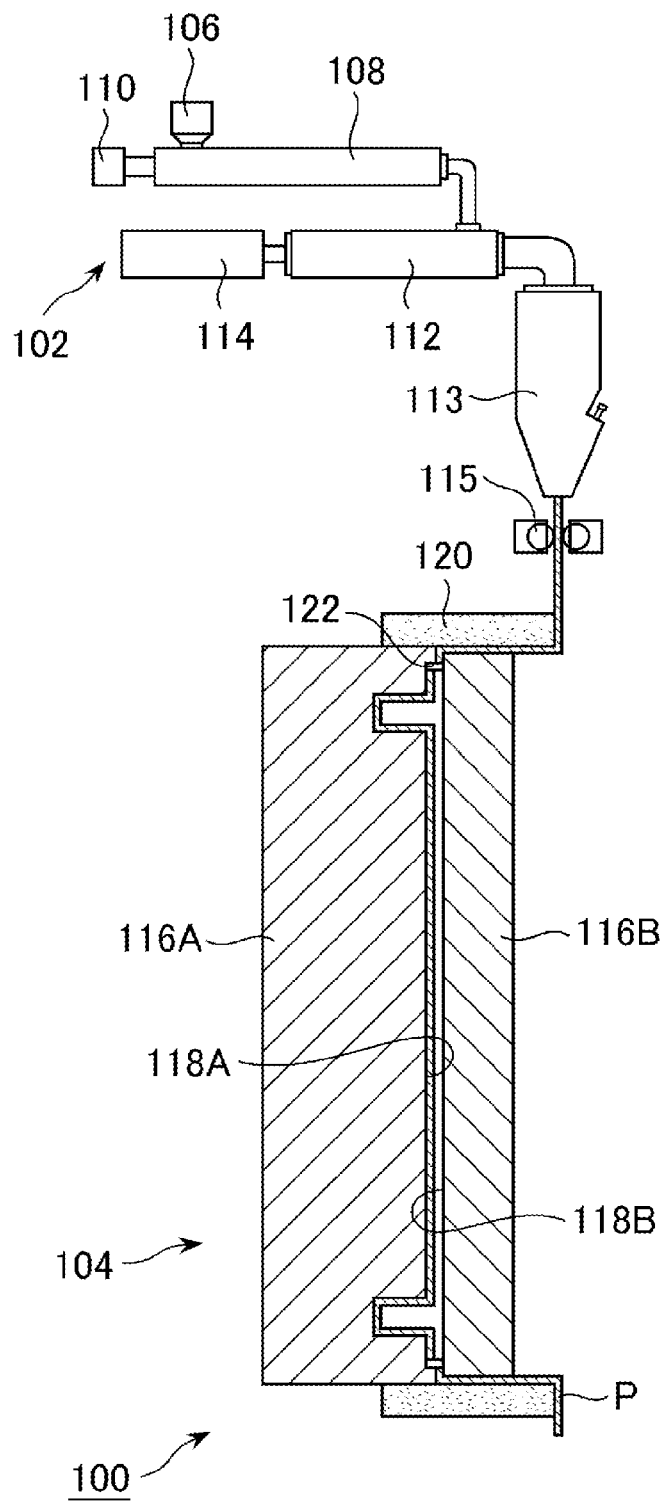
FIG. 11 is a schematic diagram illustrating a state in which the split mold blocks are clamped in the molding step of molding the impact energy absorber according to the embodiment of the present invention.
Figure 12:
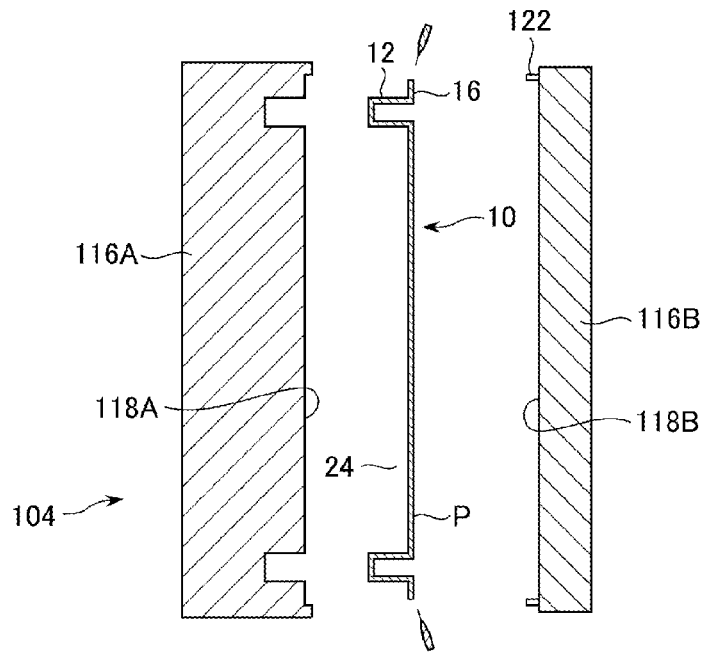
FIG. 12 is a schematic diagram illustrating a state in which the impact energy absorber is extracted by opening the split mold blocks used for forming the impact energy absorber according to the embodiment of the present invention.

Next, description is made of a molding method for the impact energy absorber 10 with reference to FIGS. 8 to 12. FIG. 8 is a schematic diagram illustrating a state in which split mold blocks are open in a molding step of molding the impact energy absorber according to the embodiment of the present invention. FIG. 9 is a schematic diagram illustrating a state in which a sealed space is formed between the cavity and the thermoplastic resin sheet in the molding step of molding the impact energy absorber according to the embodiment of the present invention. FIG. 10 is a schematic diagram illustrating a state in which the thermoplastic resin sheet is shaped by pressure reduction in the molding step of molding the impact energy absorber according to the embodiment of the present invention. FIG. 11 is a schematic diagram illustrating a state in which the split mold blocks are clamped in the molding step of molding the impact energy absorber according to the embodiment of the present invention. FIG. 12 is a schematic diagram illustrating a state in which the impact energy absorber is extracted by opening the split mold blocks used for forming the impact energy absorber according to the embodiment of the present invention.

As illustrated in FIG. 8, a molding apparatus 100 for the impact energy absorber 10 includes a molten resin extrusion device 102, and a clamping device 104 for a mold 116, which is disposed below the extrusion device 102. The thermoplastic resin in the molten state extruded from the extrusion device 102 is sent to the clamping device 104. With the clamping device 104, the molten thermoplastic resin is molded.

The extrusion device 102 is a conventionally known type. The detailed description thereof is therefore omitted. The extrusion device 102 includes a cylinder 108 provided with a hopper 106, a screw, which is not illustrated, provided in the cylinder 108, a hydraulic motor 110 connected to the screw, an accumulator 112 internally communicating with the cylinder 108, and a plunger 114 provided in the accumulator 112. The resin pellet input from the hopper 106 is melted and kneaded by the rotation of the screw by the hydraulic motor 110 in the cylinder 108. The molten resin is transferred to the accumulator chamber 112 and then stored for a certain amount. By the driving the plunger 114, the molten resin is sent toward a T-die 113. Through a die slit, which is not illustrated, a continuous thermoplastic resin sheet P is extruded. The sheet P is sent out downward while being pressed between a pair of rollers 115 disposed with a space therebetween, whereby the sheet P is suspended between split mold blocks 116. Thus, the thermoplastic resin sheet P is disposed between the split mold blocks 116 in a state of having no creases or curvature.

The extrusion slit is disposed to face vertically downward. The thermoplastic resin sheet P extruded from the extrusion slit is sent downward vertically in a state of being suspended from the extrusion slit. By allowing the size of the extrusion slit to be changed, the thickness of the thermoplastic resin sheet P can be set to the desired thickness. Thus, the thermoplastic resin sheet P with the desired thickness can be disposed between the split mold blocks 116.

On the other hand, the clamping device 104 is also the conventionally known type, in a manner similar to the extrusion device 102; therefore, the detailed description thereto is omitted. The clamping device 104 includes two split mold blocks 116A and 116B, and a mold driving device that moves the molds 116A and 116B between an open position and a closed position in a direction approximately orthogonal to the direction where the molten thermoplastic resin sheet P is supplied. The two split mold blocks 116A and 116B are disposed so that cavities 118A and 118B thereof face each other. The cavities 118A and 118B are disposed to face in the approximately vertical direction. A surface of each of the cavities 118A and 118B is provided with an uneven portion in accordance with the outer shape and surface shape of the impact energy absorber 10 to be molded by the molten thermoplastic resin sheet P.

One of the split mold blocks, 116B, is provided with a pinch-off portion 122 around the cavity 118B. This pinch-off portion 122 is formed in a circular shape around the cavity 118B. The pinch-off portion 122 protrudes toward the opposite mold 116A. When the two split mold blocks 116A and 116B are clamped, this brings the end of the pinch-off portion 122 of the mold 116B to be in contact with the mold 116A.

The mold driving device is similar to the conventional device; therefore, the description thereto is omitted. Each of the split mold blocks 116A and 116B is driven by the mold driving device. When the molds are in the open position, the molten thermoplastic resin sheet P can be disposed between the two split mold blocks 116A and 116B. On the other hand, when the molds are in the closed position, the circular pinch-off portion 122 of the split mold block 116B is in contact with the mold 116A. This forms the sealed space within the two split mold blocks 116A and 116B.

The outer peripheral portion of the split mold block 116A has a frame 120 slidably fitted thereto. With a non-illustrated frame moving device, the frame 120 can be moved relative to the mold 116A. More specifically, the frame 120 can protrude toward the mold 116B relative to the mold 116A, thereby being brought into contact with one side surface of the thermoplastic resin sheet P disposed between the molds 116A and 116B. Inside the split mold block 116A, a vacuum suction chamber, which is not illustrated, is provided. The vacuum suction chamber communicates with the cavity 118A through a suction hole, which is not illustrated. By the suction through the suction hole from the vacuum suction chamber, the thermoplastic resin sheet P is sucked toward the cavity 118A. Thus, the sheet P can be shaped conforming to the outer surface of the cavity 118A. In other words, the top wall 28 in the long-side direction of the first projection body 20 is formed tracing the outer surface of the cavity 118A.

Figure 13:
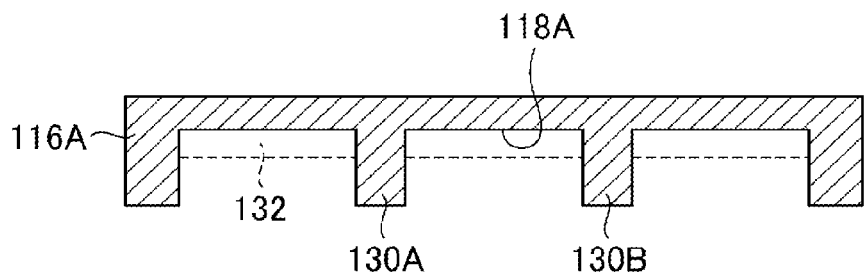
FIG. 13 is a sectional diagram taken along a line E-E of FIG. 8.

FIG. 13 is a sectional diagram taken along a line E-E of FIG. 8. As illustrated in FIG. 13, the outer surface of the cavity 118A is provided with a plurality of first slender projection bodies 130A and 130B, which extends vertically and is disposed with a predetermined distance therebetween. Moreover, the outer surface of the cavity 118A is provided with a plurality of second slender projection bodies 132, which is disposed with a predetermined distance therebetween and extends in a direction orthogonal to the plural first slender projection bodies 130A and 130B while intersecting with the plural first slender projection bodies 130A and 113B. The projection height of the first slender projection bodies 130 from the outer surface of the cavity 118A is set to be higher than the projection height of the second slender projection bodies 132 from the outer surface of the cavities 118A and 118B. In other words, the top wall 28 of the first projection body 20 is formed by the first slender projection bodies 130A and 130B. Moreover, the top wall 27 of the second projection body 22 is formed by the second slender projection body 132. The mold 116 are provided with a conventionally known blow pin, which is not illustrated, so that a blow pressure can be applied in the sealed space formed by the both split mold blocks 116A and 116B when the molds 116 are clamped.

Description is hereinafter made of a method of molding the impact energy absorber 10, in which the molding apparatus 100 for the impact energy absorber 10 with the above structure is used. First, as illustrated in FIG. 8, the stored thermoplastic resin is extruded intermittently through the extrusion slit by a predetermined extrusion amount per unit time. Thus, the thermoplastic resin is extruded at a predetermined extrusion speed with a predetermined thickness so that the resin is swollen and the molten thermoplastic resin sheet P is suspended downward. As a result, the thermoplastic resin sheet P is disposed between the split mold blocks 116.

In this case, for example, the thermoplastic resin sheet P may pass between the pair of rollers 115 after the extrusion before the molding. Thus, the cylindrical parison is pressed into a sheet shape. In this case, moreover, the thickness of the thermoplastic resin sheet P may be independently set to be a desired thickness, by adjusting the size of the slit opening of the extrusion slit or by the pair of rollers 115.

Next, as illustrated in FIG. 9, the frame 120 of the split mold block 116A is moved toward the thermoplastic resin sheet P relative to the split mold block 116A. This brings the frame 120 into contact with a side surface of the thermoplastic resin sheet P. Thus, a sealed space 140 is formed by the side surface of the thermoplastic resin sheet P, the inner peripheral surface of the frame 120, and the cavity 118A.

Next, as illustrated in FIG. 11, by sucking the air in the sealed space 140 from the vacuum chamber through the suction hole, the thermoplastic resin sheet P is sucked on the cavity 118A. Thus, the thermoplastic resin sheet P is shaped conforming to the surface of the cavity 118A.

More specifically, by the first projection bodies 130A and 130B and the second projection bodies 132 of the cavity 118A, long grooves with a complementary shape with these projection bodies are formed from a surface of the thermoplastic resin sheet P that faces the cavity 118A toward the opposite surface. Thus, the opposite surface is provided with the first projection bodies 20 and the second projection bodies 22 (see FIG. 1) and moreover with the peripheral wall 12.

Here, a portion of the thermoplastic resin sheet P is sucked to be expanded in the recess of the split mold block 116A. Therefore, this portion is formed to have small thickness. A portion of sucked at the protrusion of the split mold block 116A, the thermoplastic resin sheet P is not expanded. Therefore, this portion is formed to have large thickness. Among the portions formed to have large thickness, the portion with the largest thickness corresponding to the top surface of the protrusion of the split mold block 116A serves as the top wall 28 of the first projection body 20. When the predetermined inclination angles α and β are smaller, the thickness is smaller. When the predetermined inclination angles α and β are larger, the thickness is larger. As illustrated in FIG. 11, by clamping the split mold blocks 116A and 116B, the pinch-off potion 122 of the split mold block 116B determines the outline of the peripheral portion of the thermoplastic resin sheet P.

Next, as illustrated in FIG. 12, the split mold blocks 116A and 116B are opened. After the molded resin product is removed, the burr on the outer peripheral portion is removed; thus, the impact energy absorber 10 is completed. Thus, by repeating the steps as above every time the molten thermoplastic resin is extruded intermittently, the impact energy absorber 10 can be molded efficiently one after another. Through the extrusion molding, the molten thermoplastic resin is intermittently extruded as sheets. The extruded thermoplastic resin sheet can be shaped into a predetermined shape using the molds 116.

According to the molding method for the impact energy absorber with the above structure, the energy absorber made of resin, having the inexpensive, lightweight, and simple structure and the excellent moldability and exhibiting the excellent energy absorbing characteristic can be molded.

As the molding procedure, as aforementioned, the sealed space is formed between the resin material and the cavity 118A before the split mold blocks 116 are clamped, and then the resin material is sucked from the cavity 118A side, whereby the resin material is shaped. On this occasion, alternatively, the sealed space may be formed between the split mold blocks 116A and 116B by clamping the split mold blocks 116A and 116B. In addition, by applying the blow pressure from the sealed space, the resin material may be shaped. In this method, the shaping by the suction and the shaping by the blow pressure can secure the excellent moldability even in the molding into a complicated shape.

Further alternatively, the resin material may be shaped by, at the moment of the split mold blocks 116A and 116B being clamped, applying the blow pressure from the sealed space while the resin material is sucked from the cavity 118A side. In this method, applying the blow pressure while the air remaining in the recess of the cavity 118A is removed by the suction can similarly secure the excellent moldability.

Moreover, the shape of the split mold block 116B can be structured so that the split mold block 116B has the protrusion and recess corresponding to the recess and protrusion of the split mold block 116A. In this case, the thickness can be finely adjusted by pushing the molten resin sheet into the recess of the split mold block 116A with the use of the protrusion of the split mold block 116B. Instead of using the split mold block 116B, a plug formed to have a predetermined shape may be used to push the sheet into the split mold block 116A.

Further, in the state illustrated in FIG. 9, the sheet P may be molded in a manner that after the molten resin sheet is expanded by applying the blow pressure in the sealed space held between the split mold block 116A and the molten resin sheet, the split mold block 116A is sucked. On this occasion, the molten resin sheet may be sucked from the suction hole provided for a frame 200 so that the molten resin sheet is not separated from the frame 200. Alternatively, the sheet may be held by having the molten resin sheet interposed by the frame 200 and another member.

By changing the molding method as above, the thickness distribution of the impact energy absorber to be molded can be adjusted.

Figure 14:
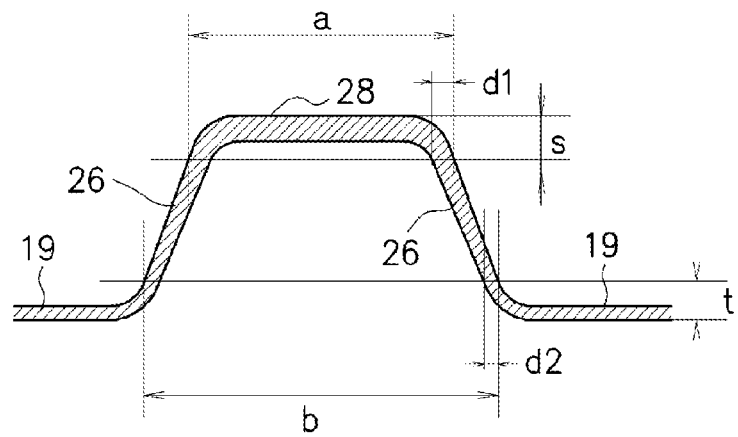
FIG. 14 is a magnified sectional diagram taken along a line D-D of FIG. 1.
Figure 15:
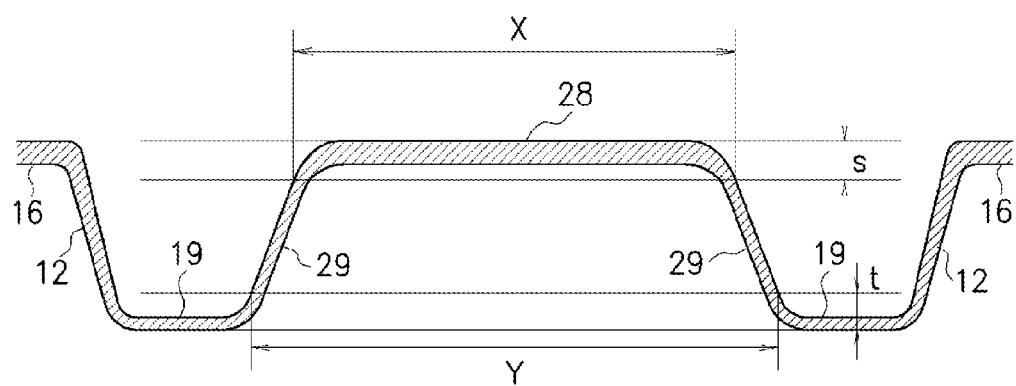
FIG. 15 is a magnified sectional diagram taken along a line B-B of FIG. 1.
Figure 16:
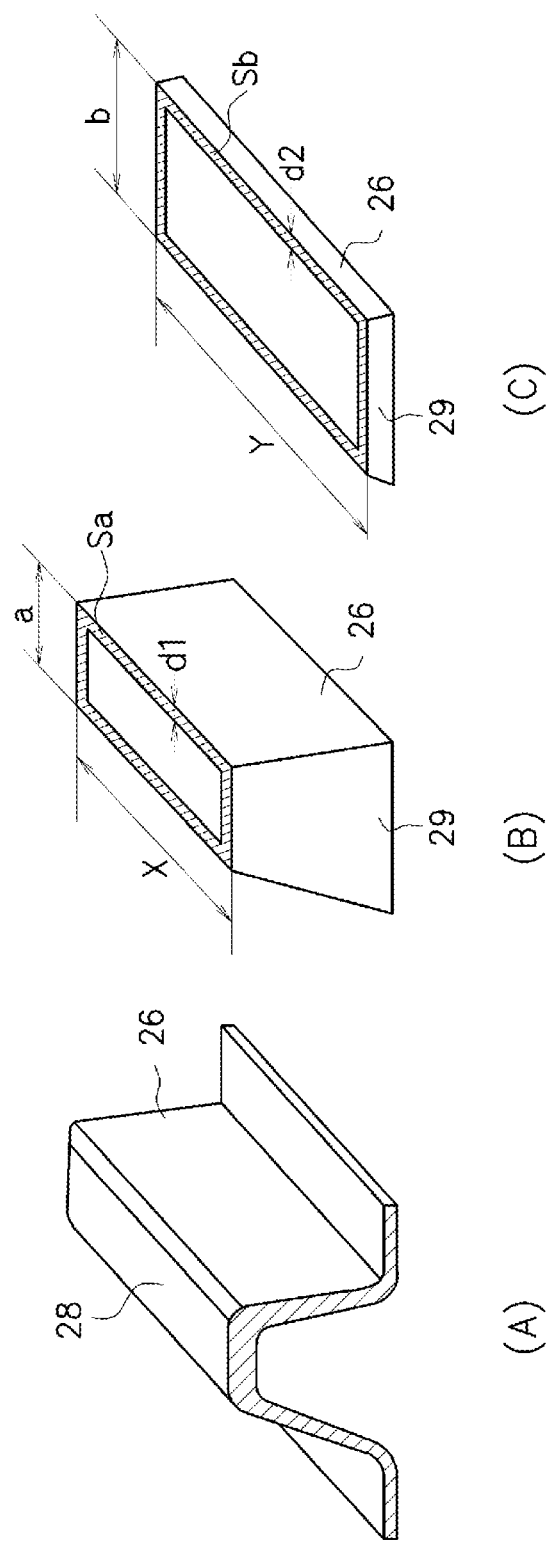
FIG. 16 are (A) a sectional perspective diagram, (B) a sectional perspective diagram taken in parallel to the long-side direction in the top wall vicinity, and (C) a sectional perspective diagram taken in parallel to the long-side direction in the planar portion vicinity, of a trapezoidal rib of the impact energy absorber.

Next, detailed description is made of the vital point of the present invention with reference to FIGS. 14 to 16. FIG. 14 is a magnified sectional diagram taken along a line D-D of FIG. 1. FIG. 15 is a magnified sectional diagram taken along a line B-B of FIG. 1. FIG. 16(A) is a sectional perspective diagram of a trapezoidal rib of the impact energy absorber.

FIG. 16(B) is a sectional perspective diagram in which the rib is cut in parallel to the long-side direction in the top wall vicinity thereof. FIG. 16(C) is a sectional perspective diagram in which the rib is cut in parallel to the long-side direction in the planar portion vicinity thereof.

In FIG. 14, the trapezoidal rib, which corresponds to the outer shape of the section orthogonal to the long-side direction of the first projection body 20, rises from the other plane 19 at the predetermined inclination angle α (FIG. 3) while drawing a curve with a predetermined radius of curvature. The rib goes through a linear portion and, while drawing again a curve with the predetermined radius of curvature, ranges to the top wall 28 parallel to the other plane 19. Here, s is defined as the distance from the upper side of the top wall 28 to the end point of the curve with the predetermined radius of curvature. Then, a is defined as the dimension of the top wall 28 in the portion ranging from the upper side of the top wall 28 to the distance s. And d1 is defined as the thickness of the long-side direction rising slope wall 26 (side wall) in the portion ranging from the upper side of the top wall 28 to the distance s.

Moreover, t is defined as the distance from the lower side of the other plane 19 to the end point of the curve with the predetermined radius of curvature. Then, b is defined as the dimension of the space between the long-side direction rising slope walls (side walls) 26 in the portion ranging from the lower side of the other plane 19 to the distance t. And d2 is defined as the thickness of the long-side direction rising slope wall (side wall) 26 in the portion ranging from the lower side of the other plane 19 to the distance t.

In FIG. 15, the trapezoidal rib, which corresponds to the outer shape of the section orthogonal to the short-side direction of the first projection body 20, rises from the other plane 19 at the predetermined inclination angle 13 (FIG. 4) while drawing a curve with a predetermined radius of curvature. The rib goes through a linear portion and, while drawing again a curve with the predetermined radius of curvature again ranges to the top wall 28 in parallel to the other plane 19. Here, s is defined as the distance from the upper side of the top wall 28 to the end point of the curve with the predetermined radius of curvature. Then, X is defined as the dimension of the top wall 28 in the portion ranging from the upper side of the top wall 28 to the distance s. And t is defined as the distance from the lower side of the other plane 19 to the end point of the curve with the predetermined radius of curvature. And Y is defined as the dimension of the space between the short-side direction rising slope walls 29 in the portion ranging from the lower side of the other plane 19 to the distance.

FIG. 16(A) is a sectional perspective diagram in which the trapezoidal rib of the impact energy absorber 10 according to the embodiment of the present invention is viewed from the short-side direction. The trapezoidal rib of the impact energy absorber 10 has the trapezoidal shape with the hollow box-like shape as illustrated in FIGS. 1 and 2. FIG. 16(B) illustrates the section appearing when the first projection body 20 is cut in the long-side direction parallel to the upper side of the top wall 28. The body 20 is also cut at the portion of the distance s from the upper side of the top wall 28 to the end point of the curve with the predetermined radius of curvature as described with reference to FIGS. 14 and 15. FIG. 16(C) illustrates the section appearing when the first projection body 20 is cut in the long-side direction parallel to the lower side of the other plane 19. The body 20 is also cut at the portion of the distance t from the lower side of the other plane 19 to the end point of the curve with the predetermined radius of curvature.

Then, in FIG. 16(B) illustrating the section appearing when the first projection body 20 is cut in the long-side direction parallel to the upper side of the top wall 28 at the portion of the distance s from the upper side of the top wall 28 to the end point of the curve with the predetermined radius of curvature as described with reference to FIG. 14, a is defined as the dimension in the short-side direction, X is defined as the dimension in the long-side direction, and d1 is defined as the thickness of the long-side direction rising slope wall (side wall) 26.

In FIG. 16(C) illustrating the section appearing when the first projection body 20 is cut in the long-side direction parallel to the lower side of the other plane 19 at the portion of the distance t from the lower side of the other plane 19 to the end point of the curve with the predetermined radius of curvature, b is defined as the dimension in the short-side direction, Y is defined as the dimension in the long-side direction, and d2 is defined as the thickness of the long-side direction rising slope wall (side wall) 26. The impact energy absorber 10 according to the embodiment of the present invention is formed so that the inclination angle α of the long-side direction rising slope wall 26=5°, the inclination angle β of the short-side direction rising slope wall 29=8°, a=12 mm, b=20 mm, X=100 mm, Y=110 mm, s=2 mm, t=2 mm, d1=1.4 mm, and d2=0.08 mm.

Here, Sa is defined as the area of the section of the first projection body 20 illustrated in FIG. 16(B), the section appearing when the first projection body 20 is cut in the long-side direction parallel to the upper side of the top wall 28 at the portion of the distance s from the upper side of the top wall 28 to the end point of the curve with the predetermined radius of curvature. Moreover, Sb is defined as the area of the section of the first projection body 20 illustrated in FIG. 16(C), the section appearing when the first projection body 20 is cut in the long-side direction parallel to the lower side of the other plane 19 at the portion of the distance t from the lower side of the other plane 19 to the end point of the curve with the predetermined radius of curvature. Then, Sa and Sb are calculated by the following formulae:

$$Sa = (a+X) \times 2 \times d1 \qquad <1>$$

$$Sb = (b+Y) \times 2 \times d2 \qquad <2>$$

Figure 18:
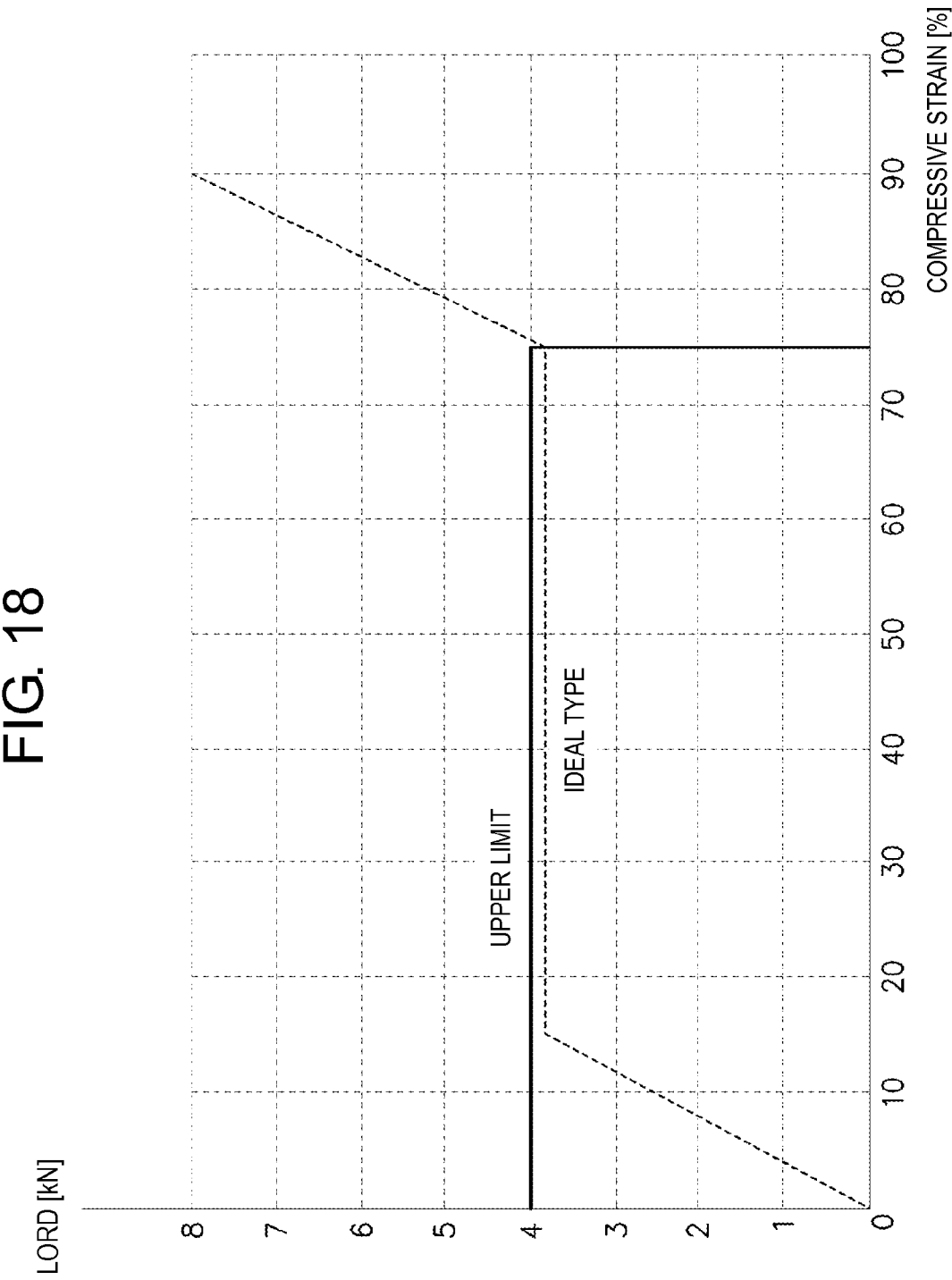
FIG. 18 is a graph representing the ideal relation between the compressive strain and the load.

Tests were conducted to learn what is the ratio of Sb to Sa (Sb/Sa), i.e., the ratio of the area of the vicinity of the plane (other plane 19) (at the portion of the distance t from the lower side of the other plane 19 to the end point of the curve with the predetermined radius of curvature) to the area of the vicinity of the impact surface (top wall 28) (at the portion of the distance s from the upper side of the top wall 28 to the end point of the curve with the predetermined radius of curvature), that would enable the impact energy absorbing characteristic to exhibit the rectangular waveform ideal as the load-compressive strain curve illustrated with a dotted line in FIG. 18.

The present inventor conducted the test as below to learn the ratio of the area of the vicinity of the plane (other plane 19) to the area of the vicinity of the impact surface (top wall 28) for the impact energy absorbing characteristic of the impact energy absorber to exhibit the ideal rectangular waveform illustrated with a dotted line as the load-compressive strain curve in FIG. 18.

(1) Test Method

With the use of the collision test machine manufactured by HODOGAYA GIKEN CORPORATION, a collision element with a weight of 20 kg and an end thereof having a load operation surface with a diameter of 60 mm was hit against the impact energy absorber 10 from the side of the top wall 28 of the first projection body at a speed of 20 km/h. The relation between the load and the compressive strain was calculated. In this test, seven samples were manufactured and evaluated, which had almost the same shape as illustrated in FIG. 1. The samples had Sb/Sas of approximately 0.25, 0.35, 0.45, 0.55, 0.65, 0.75, and 0.85. These samples were molded so that the Sb/Sa became a predetermined value by adjusting the molding method as appropriate.

(2) Test Results

Figure 17:
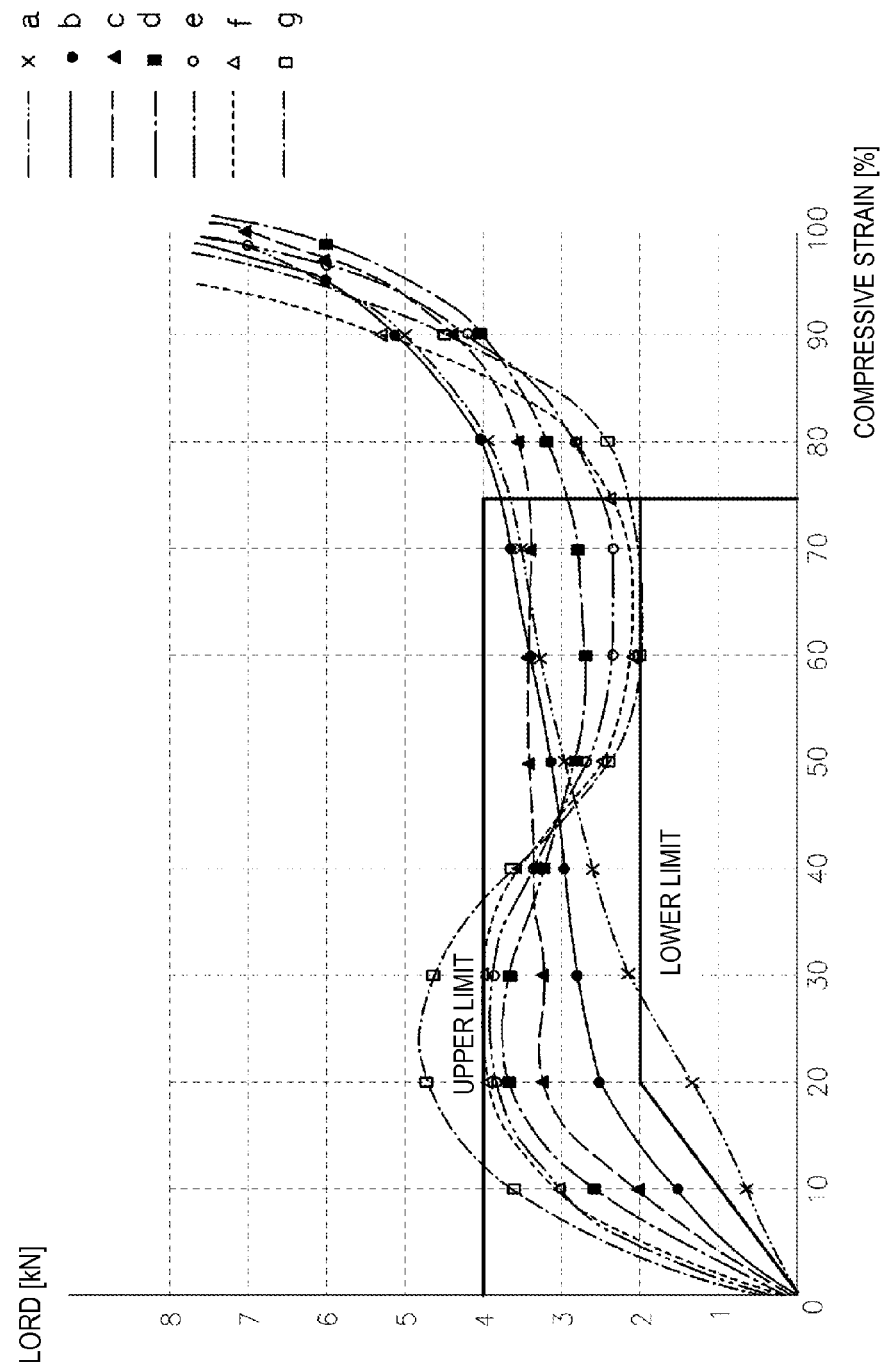
FIG. 17 is a graph representing the relation between the compressive strain and the load when the ratio between the sectional area obtained by cutting the trapezoidal rib in parallel to the long-side direction in the top wall vicinity and the sectional area obtained by cutting the trapezoidal rib in parallel to the long-side direction in the planar portion vicinity is used as the parameter.

FIG. 17 shows the test results. FIG. 17 is a graph representing the relation between the compressive strain and the load when the ratio between the sectional area taken in parallel to the long-side direction in the top wall vicinity of the trapezoidal rib and the sectional area taken in parallel to the long-side direction in the planar portion vicinity is used as the parameter. When Sb/Sa is 0.35 (line b), 0.45 (line c), 0.55 (line d), 0.65 (line e) and 0.75 (line f), the load-compressive strain curve is in the range from the upper-limit value to the lower-limit value (value 2 kN smaller than the upper-limit value) in the region of the compressive strain of 20 to 70%. In this case, the difference between the maximum load and the minimum load in the region of the compressive strain of 20 to 70% is within 2 kN. The result is preferable because the energy to be absorbed is increased. In consideration of the deformation, upon the impact, of the object to which the absorber is attached, the load is preferably decreased when the compressive strain is increased in the region of the compressive strain of 20 to 70%. Therefore, it is particularly preferable that Sb/Sa is 0.45 to 0.75. On the other hand, in the sample with an Sb/Sa of 0.25 (line a), the load is not greater than or equal to the lower-limit value when the compressive strain is 20%. In this case, the difference between the maximum load and the minimum load in the region of the compressive strain of 20 to 70% is more than 2 kN. The result is not preferable because the energy to be absorbed is decreased. With the sample having an Sb/Sa of 0.85 (line g), the upper-limit value allowable to the load is surpassed. In this case, the difference between the maximum load and the minimum load in the region of the compressive strain of 20 to 70% is more than 2 kN, which is not preferable.

The above test results indicate that the rectangular waveform ideal as the load-compressive strain curve illustrated with the dotted line in FIG. 18 can be achieved when the area (Sb) in the vicinity of the plane (the other plane 19) (at the portion of the distance t from the lower side of the other plane 19 to the end point of the curve with the predetermined radius of curvature) relative to the area (Sa) of the vicinity of the impact surface (top wall 28) (at the portion of the distance s from the upper side of the top wall 28 to the end point of the curve with the predetermined radius of curvature) satisfies the following relation.

$$0.35 \leq Sb/Sa \leq 0.75 \quad <3>$$

According to the present invention, when the area (Sb) in the vicinity of the plane (the other plane) (at the portion of the distance from the lower side of the other plane to the end point of the curve with the predetermined radius of curvature) relative to the area (Sa) in the vicinity of the impact surface (top wall) (at the portion of the distance from the upper side of the top wall to the end point of the curve with the predetermined radius of curvature) satisfies the relation of $0.35 \leq Sb/Sa \leq 0.75$, the impact energy absorber that can achieve the load-compressive strain curve extremely close to the ideal rectangular waveform to be obtained by the ideal impact energy absorber can be obtained.

The thickness variation ratio of the long-side direction rising slope wall 26 (side wall) in the trapezoidal rib, the ratio being expressed by the formula <4> below, is particularly preferable to be 40% or more, from the aspect of stable impact absorption.

$$(\text{Maximum thickness } (d1) - \text{minimum thickness } (d2))/\text{maximum thickness } (d1) \times 100[\%] \quad <4>$$

The present invention has been described based on the preferred embodiment of the present invention. Here, the present invention has been described by presenting the specific examples. Various modifications and changes can be made in these specific examples without departing from the wide range of content and range of the present invention defined in the scope of claims.

DESCRIPTION OF REFERENCE SIGNS

P Thermoplastic resin sheet
α, β Predetermined inclination angle
10 Impact energy absorber
12 Peripheral wall
14 Rectangular planar portion
15 One opposite side
16 Extension flange
17 One plate surface
18 Fixture portion
19 Other plate surface
20 First projection body
21 Other opposite side
22 Second projection body
23, 24 Long groove
25 Rising slope wall
26 Long-side direction rising slope wall (side wall)
27, 28 Top wall
29 Short-side direction rising slope wall
30 Door panel
38 Ceiling panel
100 Molding apparatus
102 Extrusion device
104 Clamping device
106 Hopper
108 Cylinder
110 Hydraulic motor
112 Accumulator
114 Plunger
116 Split mold block
118 Cavity
120 Frame
130 First slender projection body
132 Second slender projection body
140 Sealed hollow portion

The invention claimed is:

1. An impact energy absorber comprising:
a planar portion; and
a projection body, wherein:
the projection body includes a pair of lengthwise side walls that rise from the planar portion and face each other, a pair of non-lengthwise side walls that rise from the planar portion and face each other, a rectangular top wall joining top portions of the pair of lengthwise side walls and top portions of the pair of non-lengthwise side walls and serving as an impact surface;
the pair of lengthwise side walls and the pair of non-lengthwise side walls are formed so that a thickness of the walls shown in a section is the smallest at the position of rising portions and increases continuously from the planar portion toward the top wall, and the top wall has the thickness that is greater than any other portion of the projection body;

the lengthwise side walls are inclined by a predetermined inclination angle α so that the lengthwise side walls approach each other as extending from the planar portion toward the top wall, the non-lengthwise side walls are inclined by a predetermined inclination angle β so that the non-lengthwise side walls approach each other as extending from the planar portion toward the top wall, the predetermined inclination angles α and β are 2 to 15 degrees, and 0.35≤Sb/Sa≤0.75 is satisfied, wherein:

Sa is a sectional area of the projection body, the area being obtained when the body is cut on the side walls at a vicinity to the top wall in a direction parallel to the top wall; and Sb is a sectional area of the projection body, the area being obtained when the body is cut on the side walls at a vicinity to the planar portion in a direction parallel to the top wall.

2. The impact energy absorber according to claim 1, wherein the projection body is configured to form a recess with a predetermined length in the planar portion.

3. The impact energy absorber according to claim 2, wherein a thickness variation ratio of the side wall is 40% or more.

4. The impact energy absorber according to claim 1, wherein a thickness variation ratio of the side wall is 40% or more.

5. The impact energy absorber according to claim 1, wherein the predetermined inclination angle α is 3 to 7 degrees.

6. The impact energy absorber according to claim 1, wherein the predetermined inclination angle β is 6 to 10 degrees.

7. The impact energy absorber according to claim 1, further comprising a second projection body crossing the projection body, the second projection body includes a pair of second side walls that rise from the planar portion and face each other and a second rectangular top wall joining top portions of the pair of second side walls, and a height of the second top wall from the planar portion is smaller than a height of the top wall from the planar portion.

* * * * *